2,867,302

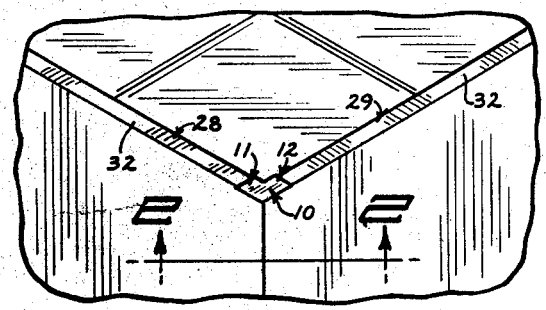
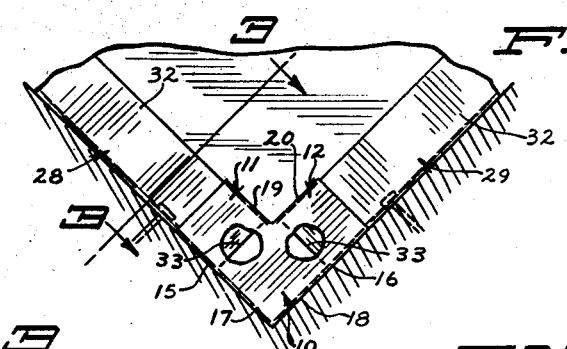
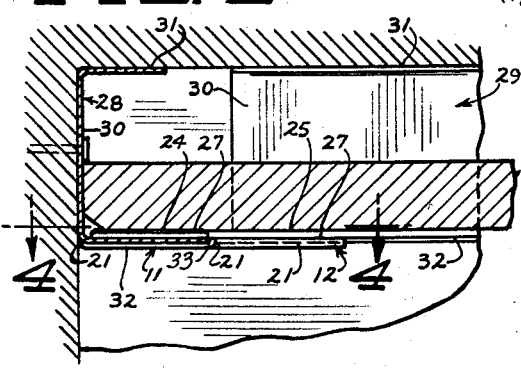
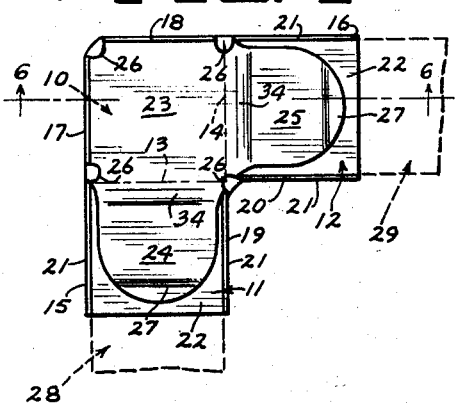
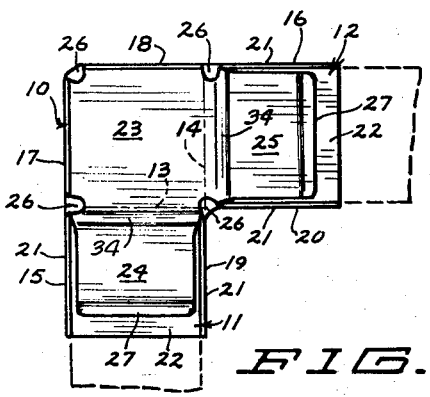
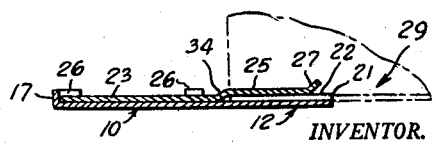
INVENTOR.
VERNER M. MILLER
BY
Braddock and Braddock
ATTORNEYS United States Patent Office 2,867,302
Patented Jan. 6, 1959

CONNECTING CLIP

Verner M. Miller, Minneapolis, Minn.

Application October 11, 1956, Serial No. 615,338

8 Claims. (Cl. 189—35)

The invention herein has relation to a connecting clip which has been devised to be especially useful for the purpose of spanning the distance between adjacent channel members upon the edges of tiles, as for example, at or in the corners of ceilings, and concealing adjacent end portions of flanges of said channel members.

It is common practice to place channel members about the exterior edges of tiles of ceilings at the locations where contiguous with walls supporting the ceilings. Vertical bodies of the channel members are situated between the tiles and the walls and secured to the walls, and horizontal lower flanges of the channel members serve as supports for the tiles and are visible to constitute borders of or for the ceilings. The ends of adjacent channel members heretofore have been mitered and horizontal lower flanges of adjacent channel members have met in abutting relation at the corners of the ceilings to provide sightly ceiling borders.

In the disclosure as made, the new and improved connecting clip is employed to span the distance between adjacent channel members at the corner of a ceiling and to conceal end portions of horizontal lower flanges of said channel members thus to eliminate the necessity of mitering without in any way rendering the ceiling border other than entirely sightly in apearance.

In the accompanying drawing forming a part of this specification,

Fig. 1 is a perspective view of a connecting clip made according to the invention as it would appear from below when applied to use in connection with channel members at a corner of a ceiling;

Fig. 2 is an enlarged bottom plan view of the connecting clip and end portions of channel members adjacent thereto as said connecting clip and channel members would appear from the position of line 2—2 in Fig. 1;

Fig. 3 is an enlarged transverse sectional view, taken on line 3—3 in Fig. 2, of the left channel member disclosing the connecting clip in edge elevation and the right channel member in elevation as it would appear from the inner side in said Fig. 2;

Fig. 4 is a plan view of said connecting clip as it would appear from the position of line 4—4 in Fig. 3;

Fig. 5 is a plan view corresponding generally with the disclosure of Fig. 4 but showing a connecting clip of slightly modified construction; and Fig. 6 is a sectional view, taken on line 6—6 in Fig. 4.

A body member of the connecting clip is constituted as a flat blank of rigid material including a square portion 10 and rectangular extensions, denoted 11 and 12, respectively, at 90 degrees apart and projecting outwardly from interior side edges, represented 13 and 14, respectively, of said square portion. Exterior side edges, indicated 15 and 16, respectively, of the rectangular extensions 11 and 12 are in alined relation to exterior side edges, designated 17 and 18, respectively, of the square portion, interior side edges, denoted 19 and 20, respectively, of said rectangular extensions are in perpendicular relation to the interior side edges 13 and 14, respectively, of the square portion, and the interior side edges 19 and 20 of the rectangular extensions 11 and 12, respectively, are in perpendicular relation to each other. The opposite side edge portions of the rectangular extensions 11 and 12 are constituted as elongated flanges, each indicated 21, which extend longitudinally of said rectangular extensions in perpendicular relation thereto. All of the elongated flanges 21 are at a single surface of the body member of the connecting clip, the top surface as disclosed in Figs. 4 and 5 of the drawing. Stated differently, an interior surface of a base 22 of each of the rectangular extensions is bounded at its opposite side edges by the flanges 21. Together, the base 22 and the flanges 21 of each rectangular extension provide a guideway for a purpose to be set forth, extending longitudinally of the rectangular extension.

An attachment element of the connecting clip is constituted as a piece of semi-rigid, flexible material including a flat square portion 23 and wings, represented 24 and 25, respectively, at 90 degrees apart and extending outwardly from interior side edges of said square portion. As disclosed in Figs. 1 to 4, the wings 24 and 25 are curvilinear. As disclosed in Fig. 5, said wings are substantially rectangular. The square portion 23 of the attachment element is approximately the same size as is the square portion 10 of the body member and is superimposed upon and clamped against said square portion of the body member by lugs 26. The wings 24 and 25 are of flexible nature and are disposed in the longitudinal guideways provided by the bases 22 and flanges 21 of the rectangular extensions 11 and 12, respectively, in contiguous or contacting relation to said base. Inner ends of the wings are offset, at 34, with respect to the adjacent edges of the square portion 23. Outer edge portions 27 of the wings 24 and 25 are bent in direction away from the body member of the connecting clip, and each of said wings, together with the adjacent surface of the base 22 of the corresponding rectangular extension, provides a gripping entity of the connecting clip.

Each of first and second channel members, denoted 28 and 29, respectively, at the left and right in Figs. 1, 2 and 3 of the drawing, is constituted as a vertical base member 30 secured to a wall, and horizontal upper and lower flanges, represented 31 and 32, respectively. The horizontal lower flanges 32 are for supporting tiles, as well as for providing an attractive border of or for a ceiling. As will be apparent from Figs. 2 and 3, ends 33 of the first and second channel members, including the horizontal lower flanges 32 thereof, are in spaced relation, the body member of the connecting clip spans the distance between the ends of said channel members and the rectangular extensions of said body member overlap the end portions of said horizontal lower flanges of the channel members thus to provide a continuous border at the corresponding corner of the ceiling.

Assembly of the connecting clip with the channel members is accomplished by manually inserting the adjacent ends of the horizontal lower flanges of said channel members into the guideways of the rectangular extensions. The oppositely disposed flanges 21 of the rectangular extensions will be spaced apart a distance approximately equal to the width of each of the horizontal lower flanges 32, which are of equal width, thus to retain each channel member and the rectangular extension with which assembled in alined relation.

In the disclosure as made, the horizontal upper and lower flanges 31 and 32 extend inwardly from the base members 30 of the channel members. If said horizontal flanges are to extend outwardly, all that is required is to turn the channel members end for end and assemble the horizontal lower flanges 32 thereof with the gripping entities of the curvilinear clip in the same general manner as herein illustrated and described.

What is claimed is:

1. A connecting clip constituted as a flat blank including a body member, an extension on said body member and spaced, parallel flanges on and projecting interiorly of said extension and providing a guideway therewith, and an attachment element constituted as a flat piece of material including a body portion superimposed upon and secured against the body member of said flat blank and a wing portion situated between said spaced, parallel flanges in contiguous relation to an internal surface of said extension.

2. A connecting clip constituted as a flat blank of rigid material including a body member, an extension on said body member and spaced, parallel flanges on and projecting interiorly of said extension and providing a guideway therewith, and an attachment element constituted as a flat piece of material including a body portion superimposed upon and secured against the body member of said flat blank and a resilient wing portion situated between said spaced, parallel flanges in contiguous relation to an internal surface of said extension.

3. A connecting clip constituted as a flat blank including a body member, extensions on said body member in perpendicular relation to each other and spaced, parallel flanges on and projecting interiorly of each of said extensions and providing a guideway therewith, the spaced, parallel flanges of said extensions, respectively, being in angular relation to each other, and an attachment element constituted as a flat piece of material including a body portion superimposed upon and secured against the body member of said flat blank and wing portions situated between the spaced, parallel flanges of the extensions, respectively, in contiguous relation to internal surfaces of said extensions.

4. A connecting clip constituted as a flat blank of rigid material including a body member, extensions on said body member in perpendicular relation to each other and spaced, parallel flanges on and projecting interiorly of each of said extensions and providing a guideway therewith, the spaced, parallel flanges of said extensions, respectively, being in angular relation to each other, and an attachment element constituted as a flat piece of material including a body portion superimposed upon and secured against the body member of said flat blank and resilient wing portions situated between the spaced, parallel flanges of the extensions, respectively, in contiguous relation to internal surfaces of said extensions.

5. The combination as specified in claim 3 wherein exterior side edges of the body member of the flat blank are in alinement with exterior edges of said extensions, respectively, and interior edges of the extensions are in perpendicular relation to each other.

6. The combination as specified in claim 4 wherein exterior side edges of the body member of the flat blank are in alinement with exterior edges of said extensions, respectively, interior edges of the extensions are in perpendicular relation to each other and the guideways provided by said extensions are of equal width.

7. A connecting clip constituted as a flat blank including a body member, extensions on said body member in the plane thereof and in perpendicular relation to each other and spaced, parallel flanges on and projecting interiorly of each of said extensions and providing a guideway therewith, the spaced, parallel flanges on said extensions, respectively, being in angular relation to each other, and an attachment element constituted as a flat piece of material including a body portion superimposed upon and secured against the body member of said flat blank and wing portions in the plane of said body portions situated between the spaced, parallel flanges of the extensions, respectively, on said body member in contiguous relation to internal surfaces of said extensions.

8. The combination as specified in claim 7 wherein exterior side edges of the body member of the flat blank are in alinement with exterior side edges of said extensions, respectively, and interior side edges of the extensions are in meeting and perpendicular relation to each other.

References Cited in the file of this patent

UNITED STATES PATENTS

| | | |
|---|---|---|
| 1,825,010 | Murphy | Sept. 29, 1931 |
| 2,242,266 | Scales | May 20, 1941 |

FOREIGN PATENTS

| | | |
|---|---|---|
| 718,711 | Germany | May 19, 1942 |